United States Patent [19]

Rumsey

[11] Patent Number: 4,662,260
[45] Date of Patent: May 5, 1987

[54] SOUND PRODUCING BALL

[76] Inventor: Daniel Rumsey, 5520 W. 118th Pl., Inglewood, Calif. 90304

[21] Appl. No.: 727,836

[22] Filed: Apr. 26, 1985

[51] Int. Cl.[4] .......................... G10H 1/00; G10H 5/04
[52] U.S. Cl. ................................. 84/1.01; 84/DIG. 2; 84/DIG. 7; 273/58 E; 273/58 G; 446/408
[58] Field of Search ........................... 273/58 G, 58 E; 446/409; 200/326, DIG 18, 61.52; 84/470, 1.01, DIG. 2, DIG. 7

[56] References Cited

U.S. PATENT DOCUMENTS

| | | | |
|---|---|---|---|
| 2,504,650 | 4/1950 | Chessrown | 446/409 X |
| 3,304,651 | 2/1967 | Deyerl | 273/58 G |
| 3,935,669 | 2/1976 | Potrzuski et al. | 273/58 G X |
| 4,043,241 | 8/1977 | Liu | 84/DIG. 20 X |
| 4,318,245 | 3/1982 | Stowell et al. | 200/61.52 X |
| 4,337,948 | 7/1982 | Breslow et al. | 273/237 |

FOREIGN PATENT DOCUMENTS 0107937  5/1984  European Pat. Off. ........ 273/153 R

*Primary Examiner*—Richard C. Pinkham
*Assistant Examiner*—Stuart W. Rose
*Attorney, Agent, or Firm*—Blakely, Sokoloff, Taylor & Zafman

[57] ABSTRACT

A sound producing device producing different notes when rotated. Three orthogonally mounted gravity switches produce signals corresponding to their orientation to a reference. A multiplexer or programmable counter coupled to the switches selects one output line for each combination of states of the switches. Each output is passed through different values of resistance so that unique frequencies result. The output of the multiplexer is coupled through an oscillator to a speaker and a tone corresponding to the frequency of the output selected is produced. Multivibrators are coupled to the switches and to the oscillator to shut off the production of sound when the device has been left at rest for a certain time period.

20 Claims, 13 Drawing Figures

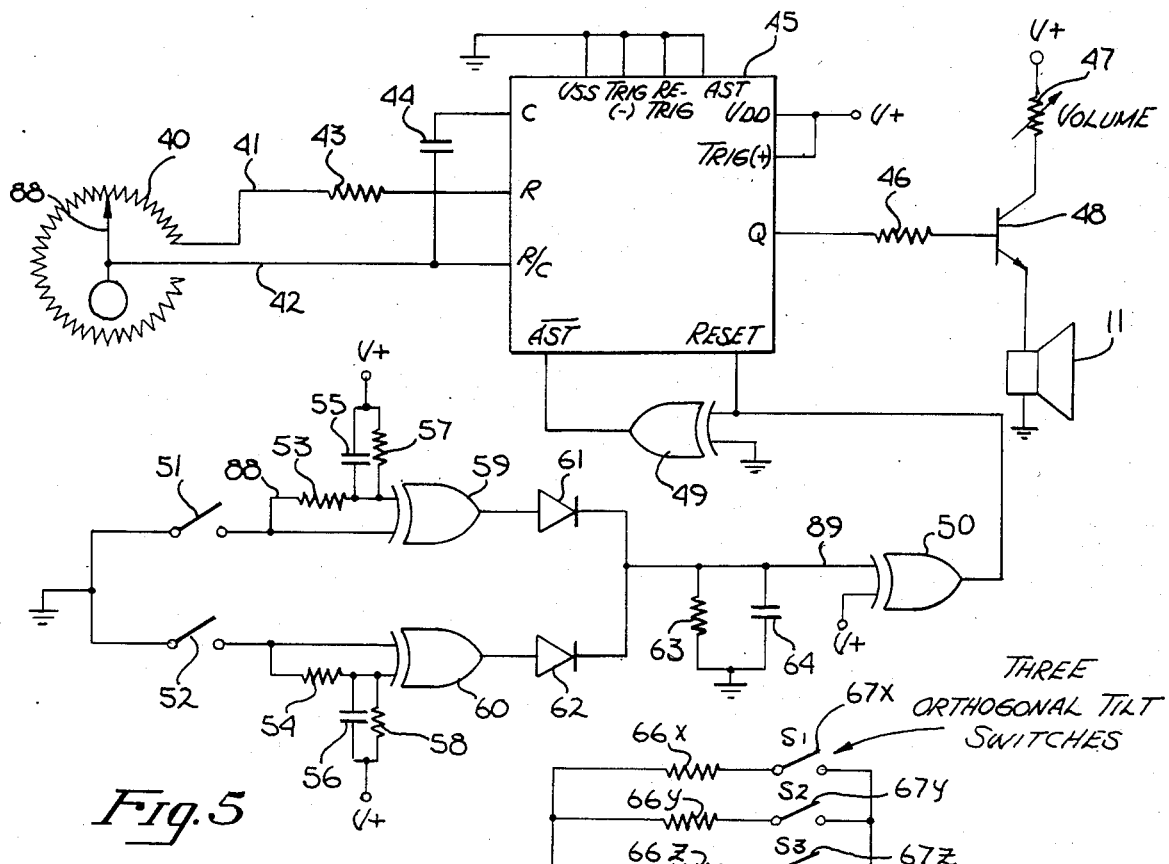
Fig. 5
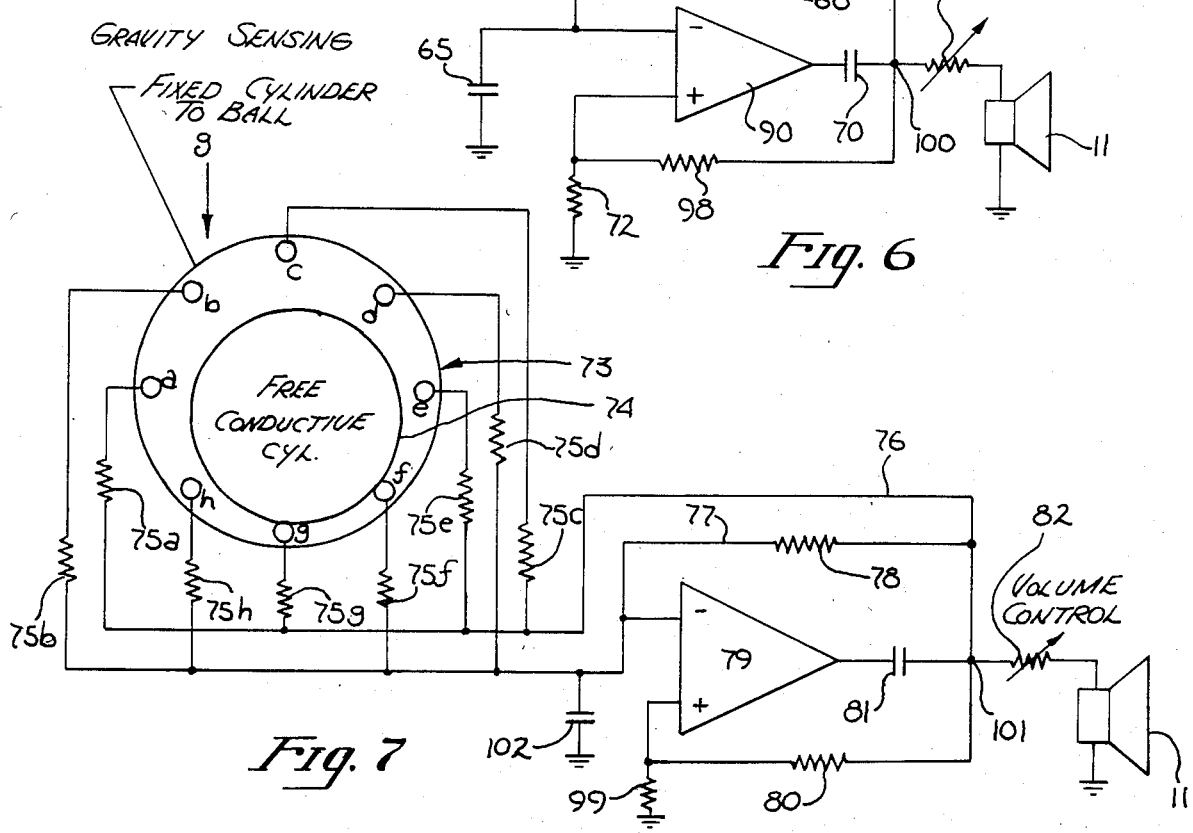
Fig. 6
Fig. 7

SOUND PRODUCING BALL

BACKGROUND OF THE INVENTION

1. Field of the Invention

This invention relates to the field of toys and amusement devices.

2. Prior Art

In the prior art, there are several examples of toy balls which will produce sounds when activated. For example, Anthony, U.S. Pat. No. 2,780,029 discloses a ball which contains a music box which plays a predetermined tune when activated. Oman, et al., U.S. Pat. No. 2,942,379 and Sebree, U.S. Pat. No. 3,395,462 each disclose balls inside of which are mounted mechanical bells which ring when the ball is moved or rolled. De Costa, U.S. Pat. Nos. 1,709,841 and 1,789,333 disclose a diaphragm contained within a ball which produces a noise or tone when moved from a position of equilibrium. These prior art balls are constrained by the fact that tones of only a single pitch are produced or, if different pitches are available, are the result of a predetermined and fixed source.

It is an object of the present invention to provide a ball which will produce tones of varying pitch, depending upon the orientation of the ball by the user.

An additional object of the present invention is to provide a ball which produces a tone only after the ball has been in a particular orientation for a certain amount of time so that a user may go from a tone of one pitch to a tone of a second pitch without activating any tones therebetween.

It is a further object of the present invention to provide a ball which will turn on when a user picks it up and turn off when a user ceases manipulation, thereby to avoid the necessity of a switch or the inadvertent discharge of the batteries.

Yet another object of the present invention is to provide a ball which will produce tones of varying pitches throughout at least one octave of a standard scale.

SUMMARY OF THE INVENTION

The present invention is a sound producing device which produces a tone whose pitch depends on the orientation of the device with respect to gravity. Signal producing means generate a unique signal for each orientation of the device. Converting means electrically convert each signal into a tone whose pitch depends on the signal received by the converting means.

BRIEF DESCRIPTION OF THE DRAWINGS

FIG. 5 is an electrical schematic illustrating an alternate circuit for sensing the position of the ball and producing tones of varying pitch.

FIG. 6 is an electrical schematic illustrating another alternate embodiment of determining ball position and producing tones.

FIG. 7 is a electrical schematic illustrating yet another alternate circuit for determining ball position and producing tones.

DETAILED DESCRIPTION OF THE PRESENT INVENTION

A ball is described which in a preferred embodiment produces tones of varying pitch depending on the orientation of the ball to a reference. In the following description, many specific details are set forth such as number of tones, number of switches, etc., in order to provide a more thorough understanding of the present invention. It will be obvious, however, to one skilled in the art, that the invention may be practiced without these specific details. In other instances, well-known circuits have not been described in detail in order not to unnecessarily obscure the present invention.

PREFERRED EMBODIMENT

Figure 1:
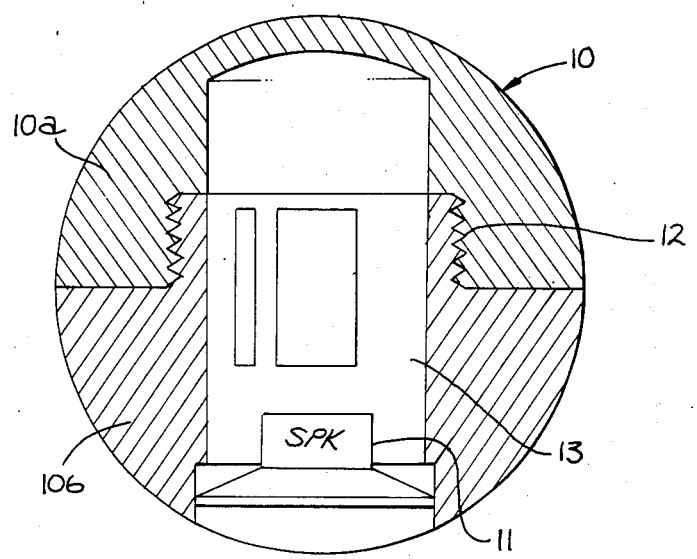
FIG. 1 is a plan view illustrating the ball of the present invention with the speaker and circuit board disposed therein.

In the preferred embodiment of the present invention, electronic means for producing sound, a power source and a speaker are mounted inside a hollow sphere or ball as shown in FIG. 1. The ball 10 is comprised of a top half 10a and a bottom half 10b which are removably connected. In the embodiment shown in FIG. 1, section 10b includes a threaded portion 12 which threadedly engages a complementary portion of section 10a. A speaker 11 is mounted within the ball 10 and affixed so as to prevent unwanted movement of the speaker even when subjected to reasonable shock and vibration. Also attached to the speaker and ball 10b is a member 13 extending along a diameter of the ball 10. Member 13 may be flat or cylindrical but is proportioned and centered to provided balance to the ball 10 with the speaker and other components thereon. For this purpose member 13 may be weighted at the end opposite the speaker to provide balance and less eccentric rolling motion.

Figure 3:
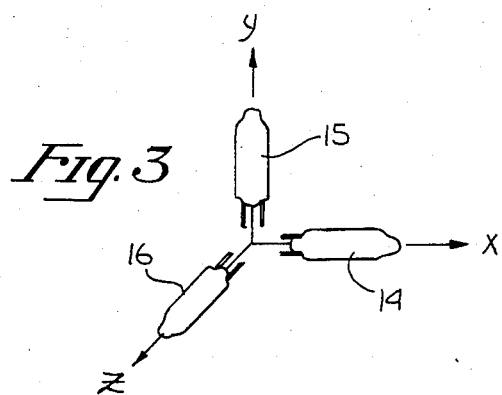
FIG. 3 illustrates three gravity switches disposed throughout orthogonally to each other as used to control the circuit of FIG. 2.

The circuitry of that embodiment is mounted on the member 13 so as to provide a stable environment and good support for the circuitry. Details of the sound producing circuitry may be seen in FIG. 2. In order to have a ball which produces different sounds when rotated to different orientations, it is first necessary to have a means of generating different signals for different orientations of the ball. The present invention accomplishes this by three switches 14, 15 and 16 shown in FIG. 2. Each switch has two states (on or off) with the switches arranged such that all combinations of the states of the switches can be achieved by changing the orientation of the ball with respect to gravity. The preferred embodiment of the present invention uses mercury or other conductive liquid gravity switches as shown in FIG. 3. These switches are arranged orthogonally on xyz axes with for example, switch 14 extending in the x direction, switch 15 extending in the y direction and switch 16 extending in the z direction. With three switches, each having two states, it is seen that it is possible to have 8 different signal combinations depending upon the state of the switches. These eight combinations are shown in the table below:

| x | y | z |
|---|---|---|
| 1 | 1 | 1 |
| 1 | 1 | 0 |
| 1 | 0 | 1 |
| 1 | 0 | 0 |
| 0 | 1 | 1 |
| 0 | 1 | 0 |
| 0 | 0 | 1 |
| 0 | 0 | 0 |

The switches 14 through 16 are coupled to multiplexer 20 through lines 19x, 19y and 19z. A voltage V+ is coupled to each line through pull-up resistors 18x through 18z respectively. The output from the switches 14 through 16 are coupled to the control inputs of the multiplexer 20. Depending upon the state of the three inputs, certain outputs x0 through x7 will be selected by the multiplexer. For example, if the output of all three switches is low (on) output x0 is selected. If all three switches are high (off) output x7 is selected. One of the eight outputs is selected for each of the eight possible combination of states of the three switches 14 through 16.

The outputs of the multiplexer 20 are each coupled to line 26 through a fixed resistor and a variable resistor. Line 26 is coupled to the "R" input of the oscillator 25. The "out" pin of multiplexer 20 is coupled through line 27 to the R/C input of oscillator 25 and through capacitors 23 and 24 in parallel to the "C" input of oscillator 25. The oscillator 25 has as output a square wave. The frequency of this square wave output may be altered by altering the inputs to the "R" and "C" inputs of the oscillator 25. The resistance on the outputs of multiplexer 20 and the capacitors 23 and 24 act as an R/C circuit which has a time constant dependent upon the value of the resistance on a particular output line selected from multiplexer 20. This time constant controls the clocking of the oscillator 25 and thus the frequency of the output pulse of the oscillator. Thus, by choosing the value of the resistance on the particular output lines of multiplexer 20, frequencies corresponding to notes of a standard scale can be produced as output of the oscillator 25. As shown for example, output x0 is coupled to a fixed resistor 21 and a variable resistor 22. In the preferred embodiment, the values of the fixed resistors for each output of multiplexer 20 are at different values so that different frequencies can be produced. The variable resistor is utilized to "trim" the fixed resistor so that the R/C circuit of the oscillator has an appropriate time delay for producing the desired frequency of output. For high volume production, automatic trimming means, such as laser trimming, may be employed. The following table illustrates the multiplexer output line, the value of the fixed resistor, and the note produced for that frequency. The variable resistor is a 25 K-ohm potentiometer which is trimmed for each output line.

| Output | Fixed Resistor (K Ohms) | Note |
|---|---|---|
| $X_0$ | 75 | C |
| $X_1$ | 56 | F |
| $X_2$ | 67 | D |
| $X_3$ | 60 | E |
| $X_4$ | 87 | C' |
| $X_5$ | 50 | G |
| $X_6$ | 40 | B |
| $X_7$ | 45 | A |

The output of the oscillator 25 is coupled through the line 30 to the base of transistor 32. The collector of transistor 32 is coupled to voltage source V+ through variable resistor 31. The emitter of transistor 32 is coupled to speaker 11. The variable resistor 31 is used as a volume control for the speaker 11. Depending upon the frequency of the signal on line 30, the speaker 11 will emit a tone of varying pitch. By turning the ball in different directions, the state of the switches 14 through 16 is altered and as a result different pitches are heard from the speaker 11.

In order to permit the user of the present invention to play "tunes" by rotating the ball, it is desirable to permit the ball to be rotated through one or more intermediate positions without hearing all notes corresponding to those positions. This is accomplished through the use of the comparator 34 and the one-shot multivibrator 36 shown in FIG. 2. The switches are coupled through lines 33x, 33y and 33z to comparator 34. For example, the output of switch 16 is coupled through line 33z to the $A_o$ and $B_o$ inputs of comparator 34. Switch 16x is coupled through line 33x to inputs $A_1$ and $B_1$ of comparator 34, and switch 16y is coupled through line 33y to the $A_2$ and $B_2$ inputs of comparator 34. The $B_o$, $B_1$ and $B_2$ inputs are coupled through resistors to the respective B inputs, with grounded capacitors $83_x$, $83_y$ and $83_z$ being coupled to each B input respectively. In this manner, a time delay is achieved between the charge of state of input A and the charge of state of input B. In the preferred embodiment of the present invention, the resistors 84x through 84z are one mega-ohm resistors and the capacitors 83x through 83z have a capacitance of 0.001 microfarads. As a result, there is a time delay of approximately 1 millisecond after the change of state of the switches before A will equal B. Thus, the comparator produces a series of positive pulses as the ball containing the circuit is rotated. The A=B output of the comparator 34 is coupled to the triggers of multivibrator 36 and 37. The output of the multivibrator 36 is coupled through line 28 to the $\overline{AST}$ (inverted asynchronous trigger) input of the oscillator 25.

The production of sounds while the ball is rotating is prevented as follows. While the ball is rotating the states of switches $16_x$–$16_z$ are changing. The switches are directly coupled to the "A" inputs ($A_0$, $A_1$, $A_2$) and indirectly to the "B" inputs ($B_0$, $B_1$ and $B_2$) of comparator 34 through the R/C line delay circuits of resistors 84 and capacitors 83. The time delay circuits cause a time delay in a changing switch signal being applied to the "B" inputs of comparator 34. Thus after a switch change of state, A will not equal B until a certain time has elapsed. As a result, the A=B output of comparator 34 will not come on until after the respective time delay. Since that time delay is approximately 1 millisecond, the A=B output of comparator 34 produces a series of positive pulses to the multivibrators 36 and 37.

Figure 9:
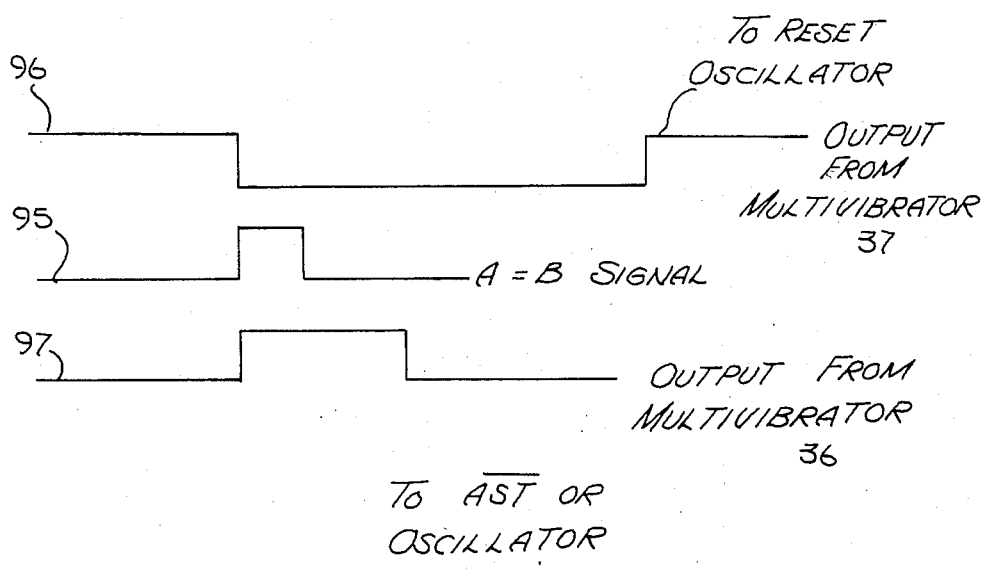
FIG. 9 is a timing diagram showing the relationship between the comparator and the multivibrators.

The output of multivibrator 36 is positive pulse whose duration depends on the values of capacitor 35 and resistor 38 coupled to the R/C inputs of multivibrator 36. The output of multivibrator 37 is a low pulse whose duration depends upon the values of capacitor 86 and resistor 87 forming an R/C circuit with multivibrator 37. As shown in the timing diagram of FIG. 9, when A=B the output from multivibrator 36 is a positive pulse as illustrated by line 97. A positive pulse on the $\overline{AST}$ input of the oscillator 25 prevents the output of sound from the oscillator 25. The output of multivibrator 37 is coupled to the reset input of the oscillator 25 as shown in FIG. 9 and the output of multivibrator 37 is a low pulse when an A=B signal is received. The period between the end of pulse 97 and the end of pulse 96 determines the length of the tone produced by the present invention. When the value of the reset input of oscillator 25 is low and the value on the $\overline{AST}$ input is low, the oscillator 25 releases output on line 30. Resistor 38 of multivibrator 36 is a variable resistor which allows for syncopation adjust. By shortening the pulse 97 produced by multivibrator 36, the tone produced by oscillator 25 will last longer, since there will be a greater time delay between when pulse 97 ceases and pulse 96 ceases.

The time during which the ball must remain in position before a tone will be produced is also determined by one shot multivibrator 36. Since no tone is produced until the pulse produced by one shot multivibrator 36 ends, the A=B output must remain high for at least that time period or no pulse will be produced. If the A=B output of comparator 34 changes during that time and produces another A=B pulse before the end of the output pulse 97 of one-shot 36, one-shot 36 is reset and its output stays high.

If the ball remains at rest for an extended period of time, no sound will be produced. The A=B output of comparator 34 will remain high, the output pulse 97 of one shot 36 will have a duration determined by capacitor 35 and resistor 38, and the output pulse 96 of one shot 37 will end after a time determined by the values of capacitor 86 and resistor 87. Thus, if the ball remains stationary for a period equal to the output pulse of one shot 37, the sound produced by the device will cease and no more sounds will be produced.

A manual on-off switch may be provided to be utilized when the ball is being carried and there is no desire for sound to be produced.

Figure 2:
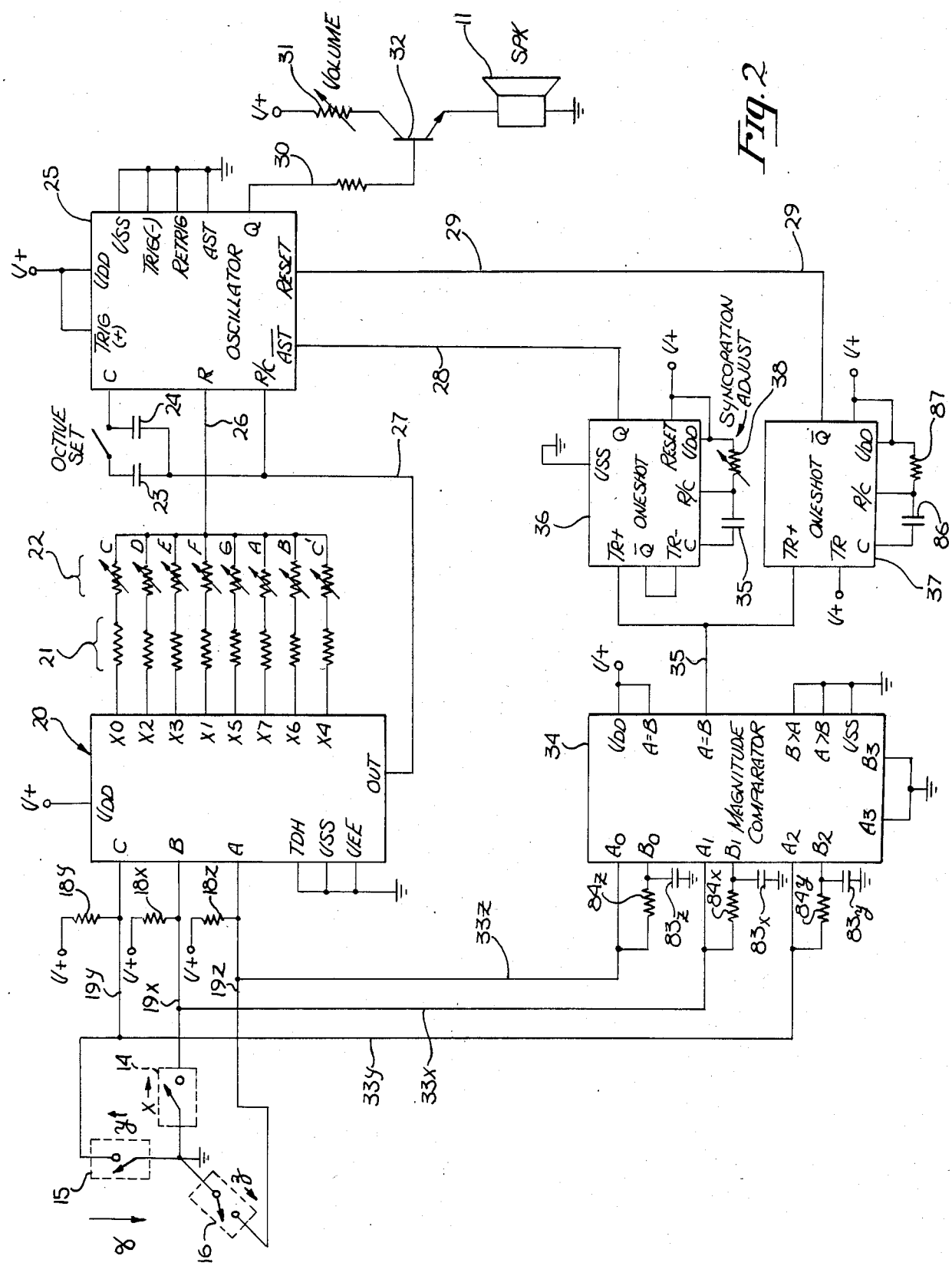
FIG. 2 is an electrical schematic illustrating a circuit used to convert the output of three switches into tones of varying pitch.

Means for controlling the octave of the tone heard from speaker 11 is provided with capacitors 23 and 24 of FIG. 2. These capacitors are coupled to the out pin of multiplexer 20. Capacitor 24 is coupled to the "C" input of oscillator 25 while capacitor 23 is coupled through a switch to the "C" input of oscillator 25. When the switch is closed, the tones produced by the oscillator 25 are an octave lower than those produced when the switch is open. This results from the additional time delay introduced into the R/C circuit of oscillator 25 from the additional capacitance.

Figure 4:
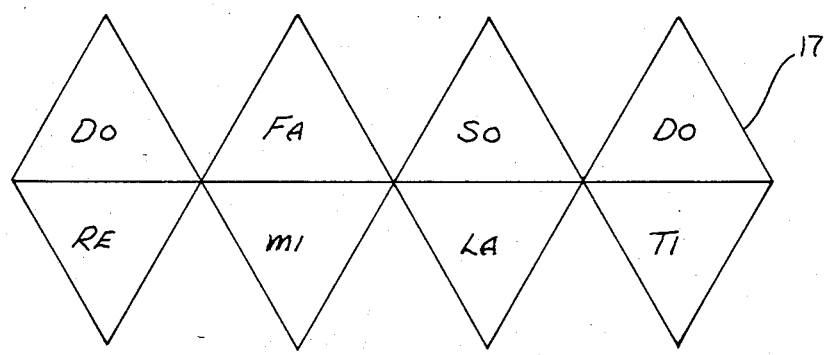
FIG. 4 illustrates a projection of the covering for the ball of the present invention with markings representing an octave of a standard musical scale.

A covering as shown in FIG. 4 may be affixed to the ball and arranged so that whenever the ball is oriented with a certain section facing up, the note represented by that section is produced by the ball. As shown, the ball may be divided into 8 sections each representing one note of a standard musical scale.

ALTERNATE EMBODIMENTS

An alternate embodiment of the sound producing circuit of the present invention is illustrated in FIG. 5. A servopotentiometer 40 is mounted within the ball. A weighted shaft 88 reacts to the orientation of the ball, varying the resistance of the potentiometer 40. The signal produced travels on line 41 through resistor 43 to the "R" input of oscillator 45. Capacitor 45 is coupled to the "C" input of oscillator 45, forming an R/C circuit with the servopotentiometer 40. The output of the oscillator 45 produces different frequencies corresponding to the time delay of this R/C circuit, which changes with the resistance of servopotentiometer 40. In this embodiment, a much greater number of tones can be produced than with the 3 switches of FIG. 2. The output of oscillator 45 passes through resistor 46 to the base of transistor 48. The collector of transistor 48 is coupled to the voltage source V+ through variable resistor 47 and the emitter of transistor 48 is coupled to speaker 11. The variable resistor controls the volume of the tone produced by the speaker 11.

Orthogonal tilt switches 51 and 52 are used to provide signals so that the state of rotation of the ball may be determined. When the switches 51 and 52 remain in the same position for a certain length of time, the oscillator 45 will be turned off. For example, when switch 51 is open, one input of exclusive OR gate 59 is voltage source V+ acting through capacitor 55 and resistor 57 coupled in parallel to line 88 between resistor 53 and that input of gate 59. The other input of gate 59 is coupled to the opposite side of resistor 53. The RC circuit of capacitor 55 and resistor 57 has associated with it a certain time constant when the position of switch 51 is changing. When switch 51 is open for any amount of time or closed for any amount of time, the capacitor 55 becomes an open circuit and both inputs to gate 59 will be high or low depending upon whether gate 51 is open or closed. As a result the output of gate 59 is low when both inputs are the same. The operation of exclusive OR Gate 60 coupled to switch 52 is similar. Thus, when the switches have been in the same position for an extended period of time, the outputs of gate 59 and gate 60 are low and are coupled through diodes 61 and 62 to line 89. Resistor 63 and capacitor 64 are coupled in parallel to line 89 and to ground. Line 89 is one input of exclusive OR gate 50 and voltage source V+ is the other. When the outputs of gates 59 and 60 are low, the output of gate 50 will be high. However, a time delay is introduced into the signal on line 89 by the R/C circuit of resistor 63 and capacitor 64. The switch positions must remain stationary for a certain amount of time before line 89 goes low.

The output of gate 50 is one input of exclusive OR gate 49 and is the reset input of oscillator 45. The other input of exclusive OR gate 49 is grounded and the output of gate 49 is coupled to the $\overline{AST}$ input of oscillator 45. The output of gate 50, coupled to the reset input of oscillator 45, and the output of gate 49 are high when the switches have been in the same position for more than a certain period, and this high signal turns off the oscillator 45 to prevent the production of sound.

A second alternate embodiment of the present invention is illustrated in FIG. 6. Three tilt switches 67x, 67y, and 67z are orthogonally mounted in the ball 10. Each switch is in parallel with a resistor such as 66x through 66z respectively. The switch resistor combinations are coupled in parallel to the inverting input and through capacitor 70 to the output of operational amplifier (op-amp) 90 at node 100. The speaker is coupled through variable resistor 69 to node 100. A capacitor 65 is coupled in parallel to the inverting input of op-amp 90 along with the switch resistor combinations. A resistor 98 is coupled in parallel with the switch resistor combinations at node 100 to the non-inverting input of the op-amp 90. Resistor 72 is coupled to ground and to the non-inverting input of op-amp 90 and acts as a voltage divider with resistor 98. The non-inverting input of op-amp 90 is slightly above the inverting input. Therefore, the output of op-amp 90 is drawn through resistor 98 and tends to keep the non-inverting input above the inverting input. This status is maintained until capacitor 65 is charged. At that time the inverting input goes above the non-inverting input, reversing the polarity and discharging capacitor 65. The amount of time this takes depends upon which switches are closed or open. The greater the resistance coupled to capacitor 65, the longer the charging of the capacitor. Correspondingly, the longer it takes the capacitor 65 to charge, the longer the time between output pulses to the speaker 11. Therefore, increased resistance results in an increased period and lower frequency. For example, if all three switches are closed, the maximum amount of resistance is presented between the output of the op-amp 90 and the capacitor 65, resulting in the lowest frequency output of the device to the speaker 11.

A further alternate embodiment of the present invention is illustrated in FIG. 7. A free conductive cylinder disposed within the tube 73 within the ball acts as a switch. Contacts a through h are disposed within the tube 73. Each contact is coupled to a resistor 75a through 75h respectively of varying resistances. These resistors are coupled in parallel to op-amp 79 in the same manner as the resistances of FIG. 6. The diameter of the conducting cynlinder 74 is such that only two contacts may be connected at one time. As the ball is rotated, the cylinder will rotate in the tube and contact different pairs of contacts. The output of op-amp 79 is coupled through capacitor 81 to node 101. As with the embodiment described in conjunction with FIG. 6, a time constant dependent on the R/C circuit formed by the switched resistors and capacitor 81 determines the frequency of output to speaker 11. The non-inverting input is coupled through resistor 80 to node 101, and also through resistor 99 to ground. Resistors 80 and 99 act as a voltage divider. The inverting input is also coupled through capacitor 102 to ground. The operation of this embodiment is similar to that shown in FIG. 6. The non-inverting is above the level of the inverting input and remains so until capacitor 102 is charged. The time it takes to charge capacitor 102 is determined by the amount of resistance between the output of the op-amp 79 and the capacitor 102. The period of charging the capacitor 102 determines the frequency of the output pulse of this device to speaker 11 and that is the frequency of the tone produced.

Figure 8:
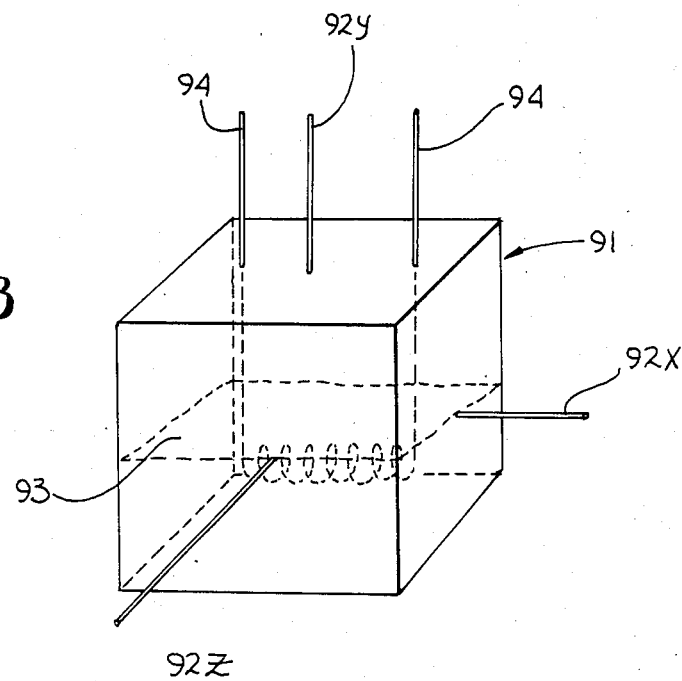
FIG. 8 is an orthogonal view of an alternative embodiment of the switching means.

An additional switching means is illustrated in FIG. 8. A hollow cube 91 having contacts 92x, 92y and 92z coupled to the cube at the mid-point of orthogonal faces is partially filled with mercury, water or some other conducting liquid 93. A single ground 94 is disposed within the cube so that it contacts the conducting liquid at all times and provides a ground. As the cube is rotated, the conducting liquid will come into contact with different faces and thus different switches. When a contact touches the liquid, that switch is "on", and when not touching liquid, that switch is "off". With the device as shown in FIG. 8, 8 possible combinations of switch outputs are available. By adding contacts to other faces, more combination of switches and thus more tones are possible.

Figure 10:
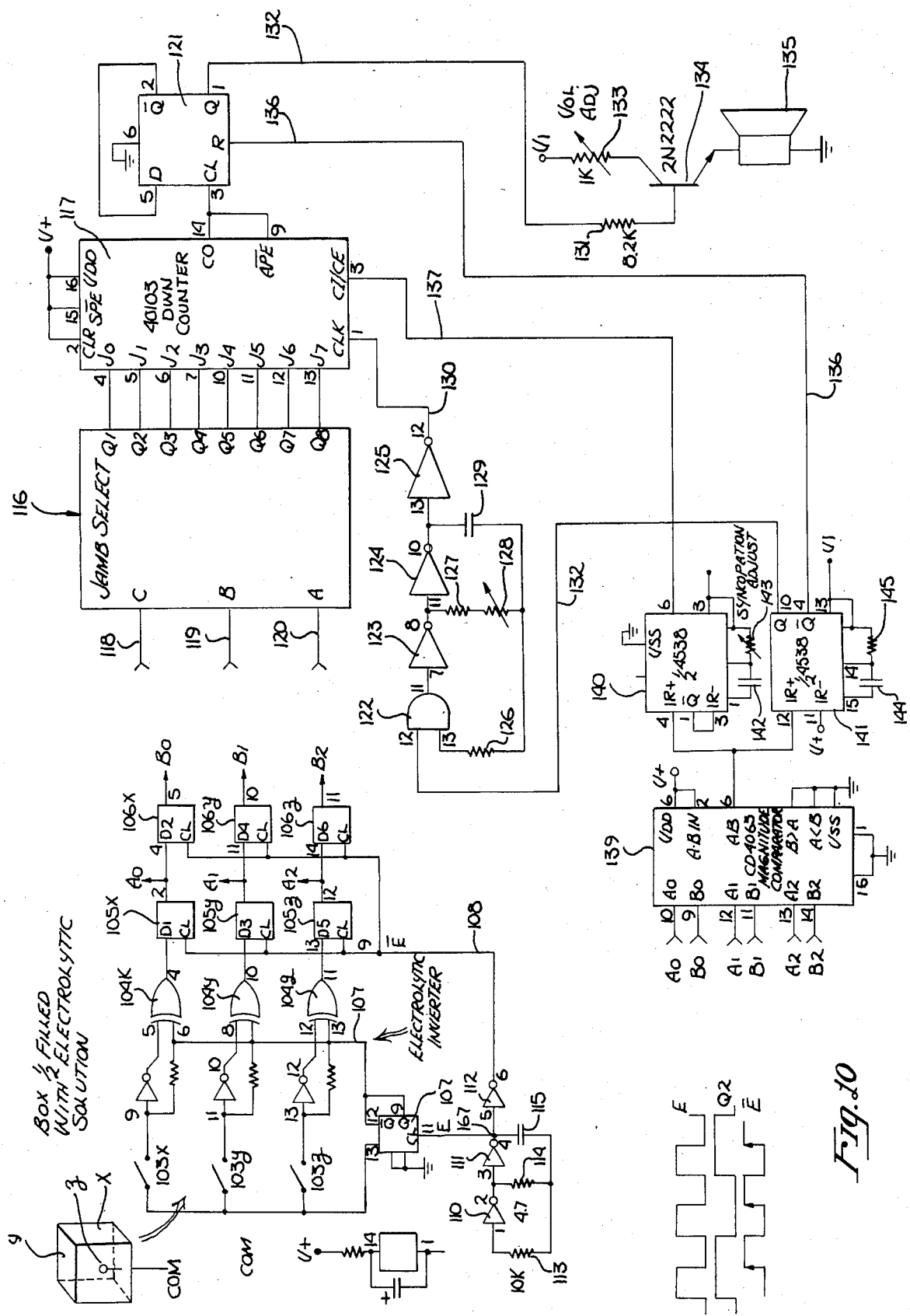
FIG. 10 is an electrical schematic illustrating still another embodiment of the present invention.

Still another alternate embodiment of the present invention is illustrated in FIG. 10. When the switching means illustrated in FIG. 8 uses water as the conducting liquid, the lifetime of the switch is shortened because of the electroplating effect on the electrodes in the water. However, by using the circuit shown in FIG. 10 with that switch means, the electroplating effect is prevented.

Switches 103x through 103z are coupled to exclusive OR gates 104x through 104z. Switch 103x acts through an inverter to form one input of exclusive OR gate 104x and acts through a resistor to provide the other input of exclusive OR gate 104x. Switches 103y and 103z are similarly connected to exclusive OR gates 104y and 104z. The exclusive OR gates have a high output when the inputs are not equal and a low output when the inputs are equal.

Also coupled to the non-inverted input of exclusive OR gates 104x through 104z is the Q output of flip-flop 107. This signal travels on line 109 and is coupled to the input between the resistor and the gate. Line 109 is also coupled to the D input of flip-flop 107. The $\overline{Q}$ output of flip-flop 107 is coupled to the switches 103x through 103z. Resistor 113 is coupled to the input of inverter 110 and to resistor 114. Resistor 114 is coupled to the output line of inverter 110 and the input of inverter 111 as well to capacitor 115. Capacitor 115 is coupled to the output of inverter 111 and to the input of inverter 112. In this manner, an oscillator is created which provides a clock signal to Node 167. Node 167 is the point of coupling between the output of inverter 111, the input of inverter 112 and capacitor 115. Signal E is taken from this node and serves as the clocking input of flip-flop 107. By having Q and $\overline{Q}$ outputs of flip-flop 107 coupled to switches 103x through 103z, the polrarity of these switches is constantly reversed, preventing electroplating build-up on the contacts.

The outputs of exclusive OR gates 104x through 104z are coupled to the D inputs of flip-flops 105x through 105z. The outputs of flip-flops 105x through 105z are coupled to the D inputs of flip-flops 106x through 106z. Each pair of flip-flops, for example flip-flops 105x and 106x, act as a shift register. The clocking signal of these flip-flops is $\overline{E}$. $\overline{E}$ is generated by passing the E signal through inverter 112 and onto line 108 which is coupled to the clocking inputs of flip-flops 105x through 105z and 106x through 106z. Signals A0 through A2 are pulled from the outputs of flip-flops 105x through 105z and B0 through B2 are pulled from the outputs of flip-flops 106x through 106z. By passing the signal through flip-flops, a time delay is introduced between signals A0 through A2 and signals B0 through B2.

The outputs A0 through A2 are coupled to the inputs of a decoding means represented by JAMB Select 116. JAMB Select 116 generates an output number on lines Q1 through Q8 corresponding to the combination of inputs A0 through A2. This number is fed into down counter 117. Down counter 117 serves as a frequency synthesizer and divides down the clocking frequency by the input number. The output consists of the carry-out signal and the $\overline{APE}$ (inverted as synchronous JAMB enable) coupled on line 168 to the clock input of flip-flop 121. Flip-flop 121 divides the output pulse of counter 117 by 2 to provide a more symmetrical output on line 132 to the speaker 135. The signal on line 132 is passed through resistor 131 to the base of transistor 134. The collector of transistor 134 is coupled through variable resistor 133 to voltage source V+. The emitter of transistor 134 is coupled to the speaker 135.

Means for providing an automatic shut-off and for preventing the production of sound while the device is turning are again provided by a comparator and a pair of one-shot multivibrators. Comparator 139 has as inputs A0 through A2 from flip-flops 105x through 105z, and inputs B0 through B2 from flip-flops 106x through 106z. As noted previously, a time delay is introduced between the signals output from flip-flops 105x through 105z and the signal output from flip-flops 106x through 106z. The A=B output of comparator 139 is coupled to the positive triggers of one-shot multivibrators 140 and 141. One-shot 140 has an RC circuit consisting of capacitor 142 and variable resistor 143 to provide the timing for the pulse generated by one-shot 140. The length of the pulse output from one-shot 141 is provided by the RC circuit of capacitor 144 and resistor 145. The timing delay between the signals produced on flip-flops 105x through 105z and flip-flops 106x through 106z is very small so the A=B output of comparator 139 presents a series of pulses to one-shots 140 and 141. The output of one-shot 140 is a positive pulse travelling on line 137 to the carry-in/clock enable input of down counter 117. One-shot 141 presents a negative pulse on line 136 to the "R" input of flip-flop 121. One-shot 141 also presents a positive pulse output on line 143 to AND gate 122. When the device has been at rest for a period longer than the period determined by capacitor 142 and variable resistor 143, a sound is produced by the speaker 135. If the ball remains at rest for a period longer than the period determine by capacitor 144 and resistor 145 of one-shot 141, the signal on line 136 goes high, shutting off the output of flip-flop 121. Transistor 134 is then turned off and no current is drawn by the speaker 135.

The clock of down counter 117 is provided by AND gate 122, whose output is coupled to inverter 123. The output of inverter 123 is coupled to resistor 127, variable resistor 128 and resistor 126 to become one input at AND gate 122. The other input of AND gate 122 is the Q output of one-shot 141. The output of inverter 123 is also coupled to the input of inverter 124. The output of inverter 124 is coupled through capacitor 129 in parallel with resistors 127 and 128. The output of inverter 124 is also coupled to the input of inverter 125, whose output is coupled on line 130 to the clock input of counter 117. It can be seen that when the Q output of one-shot 141 is low, the clock input of down counter 117 will receive a clock pulse.

Figure 11:
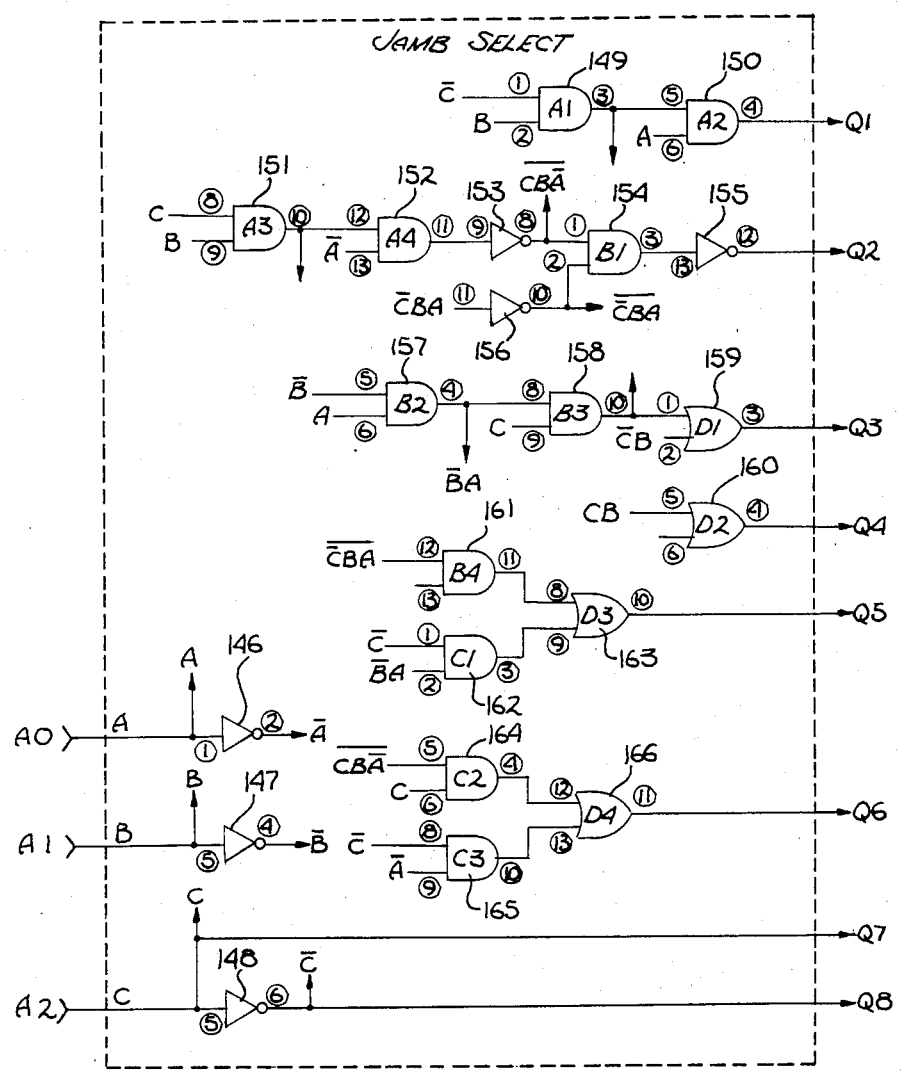
FIG. 11 is an electrical schematic illustrating the selecting means of FIG. 10.

The JAMB Select 116 is shown in greater detail in FIG. 11. Input A0 is used as signal A and passed through inverter 146 to produce signal $\overline{A}$. Signal A1 provides signal B and is passed through inverter 147 to provide signal $\overline{B}$. Signal A2 provides signal C and is passed through inverter 148 to provide signal $\overline{C}$. The output Q8 of JAMB Select 116 is $\overline{C}$. The output Q7 is C. Output Q1 is generated by passing signals $\overline{C}$ and B through AND gate 149 to produce signal $\overline{C}B$ and passing $\overline{C}B$ and A through AND gate 150. C and B are passed through AN gate 150 to form signal CB. Signal CB is combined with $\overline{A}$ at AND gate 152 and then passed through inverter 153 to form $\overline{CBA}$. $\overline{CBA}$ (which is the output Q1) is passed through inverter 156 to form $\overline{\overline{CBA}}$. This signal is combined with $\overline{CBA}$ at AND gate 154, passed through inverter 155 and forms output Q2.

Output Q3 is formed by adding $\overline{B}$ and A at AND gate 157 to form output $\overline{B}A$. This is input along with C into AND gate 158 to form $C\overline{B}A$ which is input to OR gate 159 along with $\overline{C}B$ to form output Q3. CB from AND gate 151 and $C\overline{B}A$ from AND gate 158 are coupled to OR gate 160 to form output Q4.

$\overline{CBA}$ from inverter 156 and B are coupled to AND gate 161. $\overline{C}$ and $\overline{B}A$ are combined at AND gate 162. The outputs of AND gates 161 and 162 are coupled to OR gate 163 whose output is Q5.

Finally, $\overline{CBA}$ from inverter 153 and signal C are combined at AND gate 164 whose output is one input of OR gate 166. $\overline{C}$ and $\overline{A}$ are added at AND gate 165 whose output is the other input of OR gate 166. The output of OR gate 166 represents Q6.

The frequencies generated by various combinations of A, B and C inputs of JAMB Select 116 after passing through down counter 117 are shown below.

| Frequency | CBA | Period Rate | Q1 | Q2 | Q3 | Q4 | Q5 | Q6 | Q7 | Q8 |
|---|---|---|---|---|---|---|---|---|---|---|
| 297 | 000 | 160/90 | 0 | 0 | 0 | 0 | 0 | 1 | 0 | 1 |
| 330 | 001 | 144/90 | 0 | 0 | 0 | 0 | 1 | 0 | 0 | 1 |
| 264 | 010 | 180/90 | 0 | 0 | 1 | 0 | 1 | 1 | 0 | 1 |
| 352 | 011 | 135/90 | 1 | 1 | 1 | 0 | 0 | 0 | 0 | 1 |
| 495 | 100 | 96/90 | 0 | 0 | 0 | 0 | 0 | 1 | 1 | 0 |
| 440 | 101 | 108/90 | 0 | 0 | 1 | 1 | 0 | 1 | 1 | 0 |
| 528 | 110 | 90/90 | 0 | 1 | 0 | 1 | 1 | 0 | 1 | 0 |
| 396 | 111 | 120/90 | 0 | 0 | 0 | 1 | 1 | 1 | 1 | 0 |

Although the present invention has been described as disposed within a hollow sphere, other suitable shapes may be employed. For example, the device could be contained within a cube, an octahedron, a cylinder or other desired shapes. Additionally, the switches may be disposed other than orthogonally and more than three switches may be utilized.

Thus, a sound producing ball has been described which can produce tones of varying pitch corresponding to the scale of one octave, will turn itself on and off and permits the user to determine combinations of tones.

I claim:

1. A sound producing device comprising:
supporting shell means including at least two (2) removably connected sections;
speaker means within said shell means;
a power source mounted within said shell means;
a plurality of gravity switches electrically coupled to said power source, the state of any one of said switches being dependent upon the orientation of that said switch to a reference, each of said switches mounted to said shell means at a different orientation than any other of said switches;
decoding means coupled to said switches for determining the state of each of said switches, said decoding means producing a unique signal for each combination of states of said switches, each of said signals having a unique frequency, said decoding means coupled to said speaker means, each of said signals producing an audible tone in said speaker of a frequency corresponding to the frequency of said signal;
control means including time delay means for determining whether a tone will be produced;
said control means coupled to said switches and said decoding means, said control means producing a first signal when the state of said switches remains constant for a first amount of time, said device producing a a tone only in response to said first signal;
whereby different sounds are produced when the orientation of said shell to said reference is altered.

2. The device as defined by claim 1 wherein said supporting shell means comprises a hollow sphere having a first and second section, said first and second section removably connected.

3. The device as defined by claim 1 wherein said decoding means comprises:
a multiplexer coupled to an oscillator;
said multiplexer coupled to said switches, said multiplexer having as output one signal for each combination of said states of said switches;
said oscillator having as output a signal of a certain frequency, one of said frequencies for each of said outputs of said multiplexer.

4. The device as defined by claim 1 wherein said plurality of switches comprises three (3) switches disposed orthogonally to each other.

5. The device as defined by claim 1 wherein said switches are comprised of conducting liquid filled gravity switches.

6. The device as defined by claim 1 wherein said control means turns off said decoding means when said shell means does not change position for a second amount of time.

7. The device as defined by claim 6 wherein said control means comprises a comparator coupled to said switches and to a multivibrator, said multivibrator coupled to said decoding means.

8. A circuit mounted in a hollow sphere for producing different tones when said sphere is rotated comprising;
a plurality of gravity switches having a first and second state each of said switches disposed at different orientation to a reference than any other of said switches;
a multiplexer, each input of said multiplexer coupled to one of said switches, said multiplexer having a plurality of outputs, one of said outputs selected for each combination of states of said switches, each of said outputs coupled to a resistor of predetermined resistance for establishing a unique frequence for each of said outputs;
an oscillator coupled to said outputs, said oscillator producing a first signal of a frequency corresponding to the frequency of said output selected by said multiplexer, said oscillator coupled to a speaker for producing audible tones corresponding to the frequency of said first signal;
time delay means for determining whether the state of said switches has remained constant for a first duration;
a comparator coupled to said switches, said comparator producing a second signal when the state of said switches remains constant for said first duration, said second signal having a leading and falling edge;
a first multivibrator coupled to said comparator, said first multivibrator producing a third signal at said leading edge of said second signal, said first multivibrator coupled to said oscillator so that said third signal enables said oscillator to Produce said first signal;
a second multivibrator coupled to said comparator, said second multivibrator producing a fourth signal at said falling edge of said signal, said second multivibrator coupled to said oscillator so that said fourth signal prevents said oscillator from producing said first signal;
whereby said speaker produces a tone only when the state of said switches has been constant for said first duration and said speaker will be silent when said switches remain in said constant state.

9. The circuit as defined by claim 8 wherein said switches are comprised of three conducting liquid filled switches disposed orthogonally to each other.

10. A circuit for producing tones of varying frequency when the orientation of said circuit to a reference is altered comprising:
a servopotentiometer having a weighted shaft pivotally mounted therein, said servopotentiometer producing a magnitude of resistance corresponding to the position of said shaft in said servopotentiometer;
an oscillator coupled to said servopotentiometer for producing an output signal, said output signal having a frequency dependent upon the resistance os said servopotentiometer, said output signal coupled to a speaker for producing an audible tone corresponding to the frequency of said output signal;
a plurality of first gates, each of said gates having first and second inputs coupled to ground through a gravity switch, each of said first inputs shunts to a voltage source through a capacitor and resistor in parallel, the output of said plurality of first gates being low when said switches remain in one state for a first duration;
time delay means comprising a capacitor and resistor for determining whether the state of said switches has remained constant for a time interval;
a second gate having third and fourth inputs, said third input coupled to the outputs of said plurality of first gates and shunted to ground through said time delay means, said fourth input coupled to said voltage source, said second gate having a high output when said plurality of first gates have a low output;
said output of said second gate coupled to said oscillator so that said oscillator is reset when said output from said second gate is high;
a third gate having a fifth and sixth input, said fifth input coupled to said output of said second gate, said sixth input coupled to ground, the output of said third gate coupled to said oscillator, the output of said third gate being high when said output of said second gate is high, said output of said third gate coupled to said oscillator for enabling said oscillator;
whereby if said circuit is stationary for said first duration, said circuit will not produce sound.

11. A device for producing tones of varying frequency when the orientation of said device to a reference is altered comprising:
a plurality of switches having a first and second state, the state of any one of said switches being dependent upon the orientation of a particular one of said switches to a reference, each of said switches mounted to said device at a different orientation than any other of said switches;
a first flip flop coupled to said switches, said first flip flop having first and second outputs, said first output coupled to one terminal of each of said switches and said second output coupled to the other terminal of each of said switches, the states of said first and second outputs periodically reversing, thereby reversing the polarity of said switches;
decoding means coupled to each of said switches for producing a unique number for each combination of states of said switches;

frequency generating means coupled to said decoding means for producing a unique frequency for each unique number of said decoding means;

speaker means coupled to said frequency generating means for producing an output having a frequency corresponding to said unique frequency of said output of said frequency generating means;

control means coupled to said switches and to said frequency generating means, said cntrol means turning off said frequency generating means when said device does not change orientation for a certain period of time, said control means comprising a comparator coupled to each of said switches and to a multivibrator, said multivibrator coupled to said frequency generating means;

a plurlaity of second flip flops coupled to each of said switches and to said comparator for providing a first signal to said comparator and a second signal to said comparator, wherein said second signal is equal to said first signal but delayed by a fixed amount of time;

time delay means comprising said second flip flops for determining whether the state of said switches has remained constant for said certain period of time and detecting the absence of orientation change whereby the frequency of a tone produced by said speaker means depends on the orientation of said device.

12. A device as described by claim 11 wherein said decoding means consists of a plurality of combinations of gate means, each of said combinations having an output, said outputs of said combinations defining said unique number.

13. A device as described by claim 11 wherein said frequency generating means consists of a down counter having a clock input of a certain frequency, said down counter dividing said clock input by said unique number to produce said output of said unique frequency.

14. A sound producing device comprising:

supporting shell means including at least two (2) removably connected sections;

speaker means mounted within said shell means;

a power source mounted within said shell means;

a plurality of gravity switches electrically coupled to said power source, the state of any one of said switches being dependent upon the orientation of that said switch to a reference, each of said switches mounted to said shell means at a different orientation than any other of said switches;

decoding means coupled to said switches for determining the state of each of said switches, said decoding means producing a unique signal for each combination of states of said switches, each of said signals having a unique frequency, corresponding to a tone of a musical scale, said decoding means coupled to said speaker means, each of said signals producing an audible tone in said speaker of a frequency corresponding to a tone of a musical scale;

control means coupled to said switches and said decoding means, said control means including time delay means for determining a first amount of time that the state of said switches remains constant producing a first signal when the state of said switches remains constant for said first amount of time, said device producing a tone only in response to said first signal;

whereby various tones of a musical scale are produced when the orientation of said shell to said reference is altered.

15. The device as defined by claim 14 wherein said supporting shell means comprises a hollow sphere having a first and second section, said first and second section removably connected.

16. The device as defined by claim 14 wherein said decoding means comprises:

a multiplexer coupled to an oscillator;

said multiplexer coupled to said switches, said multiplexer having as output one signal for each combination of said states of said switches;

said oscillaotr having as output a signal of a certain frequency, one of said frequencies for each of said outputs of said multiplexer, each of said frequencies corresponding to a tone of a musical scale.

17. The device as defined by claim 14 wherein said plurality of switches comprises three (3) switches disposed orthogonally to each other.

18. The device as defined by claim 14 wherein said switches are comprised of conducting liquid filled gravity switches.

19. The device as defined by claim 14 wherein said control means turns off said decoding means when said shell means does not change position for a second amount of time.

20. The device as defined by claim 19 wherein said control means comprises a comparator coupled to said switches and to a multivibrator, said multivibrator coupled to said decoding means.

* * * * *